United States Patent [19]
Nass

[11] Patent Number: 6,152,636
[45] Date of Patent: Nov. 28, 2000

[54] GLASS MOUNT FOR MOTOR-VEHICLE WINDOW

[75] Inventor: Ulrich Nass, Mülheim, Germany

[73] Assignee: Kiekert AG, Heiligenhaus, Germany

[21] Appl. No.: 09/133,651

[22] Filed: Aug. 13, 1998

[30] Foreign Application Priority Data

Aug. 13, 1997 [DE] Germany .......................... 197 34 995

[51] Int. Cl.$^7$ .................................................. E05F 11/38
[52] U.S. Cl. ........................ 403/13; 403/350; 403/409.1; 403/DIG. 8; 49/375
[58] Field of Search ......................... 403/13, 14, DIG. 8, 403/350, 409.1; 49/358, 375; 296/201, 146.16

[56] References Cited

U.S. PATENT DOCUMENTS

| | | | |
|---|---|---|---|
| 4,723,809 | 2/1988 | Kida et al. ........................... | 296/201 X |
| 5,537,783 | 7/1996 | Kazino et al. .............................. | 49/375 |
| 5,622,005 | 4/1997 | Ochenski et al. ......................... | 49/375 |
| 5,935,356 | 10/1999 | Soldner ................................ | 296/201 X |

FOREIGN PATENT DOCUMENTS

94/03341 2/1994 WIPO .

*Primary Examiner*—Lynne H. Browne
*Assistant Examiner*—John R. Cottingham
*Attorney, Agent, or Firm*—Herbert Dubno; Andrew Wilford

[57] ABSTRACT

A mount for attachment to a window having a pair of faces and a hole extending between the faces has a body adapted to engage one of the faces and having a pin projecting with play through the hole and past the other face, a retainer adapted to engage the other face and formed with a passage snugly receiving the pin, and an eccentric ring engaged in the hole and having an eccentric passage snugly receiving the pin. Formations on the ring and on the retainer are interengageable in any of a multiplicity of angularly offset position of the retainer relative to the eccentric ring and retain the ring against rotation in the hole relative to the bodies. The pin is in a different position relative to the window hole in each of the angularly offset positions. The eccentric ring includes an inner ring having a cylindrical inner periphery forming the eccentric-ring passage and a cylindrical outer periphery having a center offset from that to the inner periphery, and an outer ring having a cylindrical inner periphery engaging the inner-ring outer periphery and an outer periphery directly engaging edges of the window hole.

15 Claims, 7 Drawing Sheets

GLASS MOUNT FOR MOTOR-VEHICLE WINDOW

FIELD OF THE INVENTION

The present invention relates to a glass mount. More particularly this invention concerns a fixture attached to a window pane, normally a motor-vehicle window, so that the window can be held and moved.

BACKGROUND OF THE INVENTION

A motor-vehicle window glass is typically formed with two throughgoing holes that are each provided with a mainly metallic mount that in turn is connected to the raising/lowering cable and that also might ride in tracks in the door. The window itself can be fairly large, with a substantial distance between the two holes, and the guide structures that engage the mounts can similarly be fairly widely spaced, so that if any of the structure is not perfectly positioned, the missed tolerances will add up and the window will not track smoothly. This can be a particular problem when as described in WO 94/03341 of Morando the mounts are made to fit complementarily and snugly to the holes in the window, since then the guides and other structure must be made adjustable in order to accommodate a bad fit.

OBJECTS OF THE INVENTION

It is therefore an object of the present invention to provide an improved motor-vehicle window mount.

Another object is the provision of such an improved motor-vehicle window mount which overcomes the above-given disadvantages, that is which allows some degree of adjustability of the mounts themselves without substantially increasing the cost of the structure.

SUMMARY OF THE INVENTION

A mount for attachment to a window having a pair of faces and a hole extending between the faces has according to the invention a body adapted to engage one of the faces and having a pin projecting with play through the hole and past the other face, a retainer adapted to engage the other face and formed with a passage snugly receiving the pin, and an eccentric ring engaged in the hole and having an eccentric passage snugly receiving the pin. Formations on the ring and on the retainer are interengageable in any of a multiplicity of angularly offset position of the retainer relative to the eccentric ring and retain the ring against rotation in the hole relative to the bodies. The pin is in a different position relative to the window hole in each of the angularly offset positions.

Thus with this system the eccentric ring can be adjusted to set the pin at any of a multiplicity of different positions. This allows the mount to be moved about on the window to compensate for any misalignment of the holes and/or the window guides. Once the correct position is determined, it can easily be locked in place and can be counted on not to change. Thus during assembly, for instance, of a motor-vehicle door, the pins of the main body are poked through the window holes and eccentric rings and the retainers are left off. Once the window is perfectly positioned, so that it closes square and rides smoothly in the tracks, the retainers are snapped in place to complete the installation.

The formations according to the invention include an array of outwardly directed teeth on the ring and an array of inwardly directed teeth on the retainer. The eccentric ring includes an inner ring having a cylindrical inner periphery forming the eccentric-ring passage and a cylindrical outer periphery having a center offset from that to the inner periphery and an outer ring having a cylindrical inner periphery engaging the inner-ring outer periphery and an outer periphery directly engaging edges of the window hole. Normally the window hole is elongated horizontally or vertically. The outer ring is of a soft nonmetallic material.

The pin and retainer in accordance with the invention have axially extending interengaging formations that angularly lock the retainer on the pin. Furthermore the pin is formed with an outwardly open circumferential groove and the retainer is formed with an inwardly projecting ridge engaged in the groove and retaining the pin in the retainer.

The body is provided with a plurality of arms extending radially of an axis of the pin and bearing axially on the one face of the window. These arms have padded ends engaging the one face.

The body and pin are formed with an anchor slot for a lift cable and the body is formed on the slot with a seat for an anchor on the lift cable. The body has padded bumpers to each side of the slot engaging the one face and is formed with an arm engaging around an edge of the window to the other face thereof. This arm is offset from the slot and is shaped as a hook.

The body, eccentric ring, and retainer are made of hard plastic so that they do not chip or crack the glass of the window.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
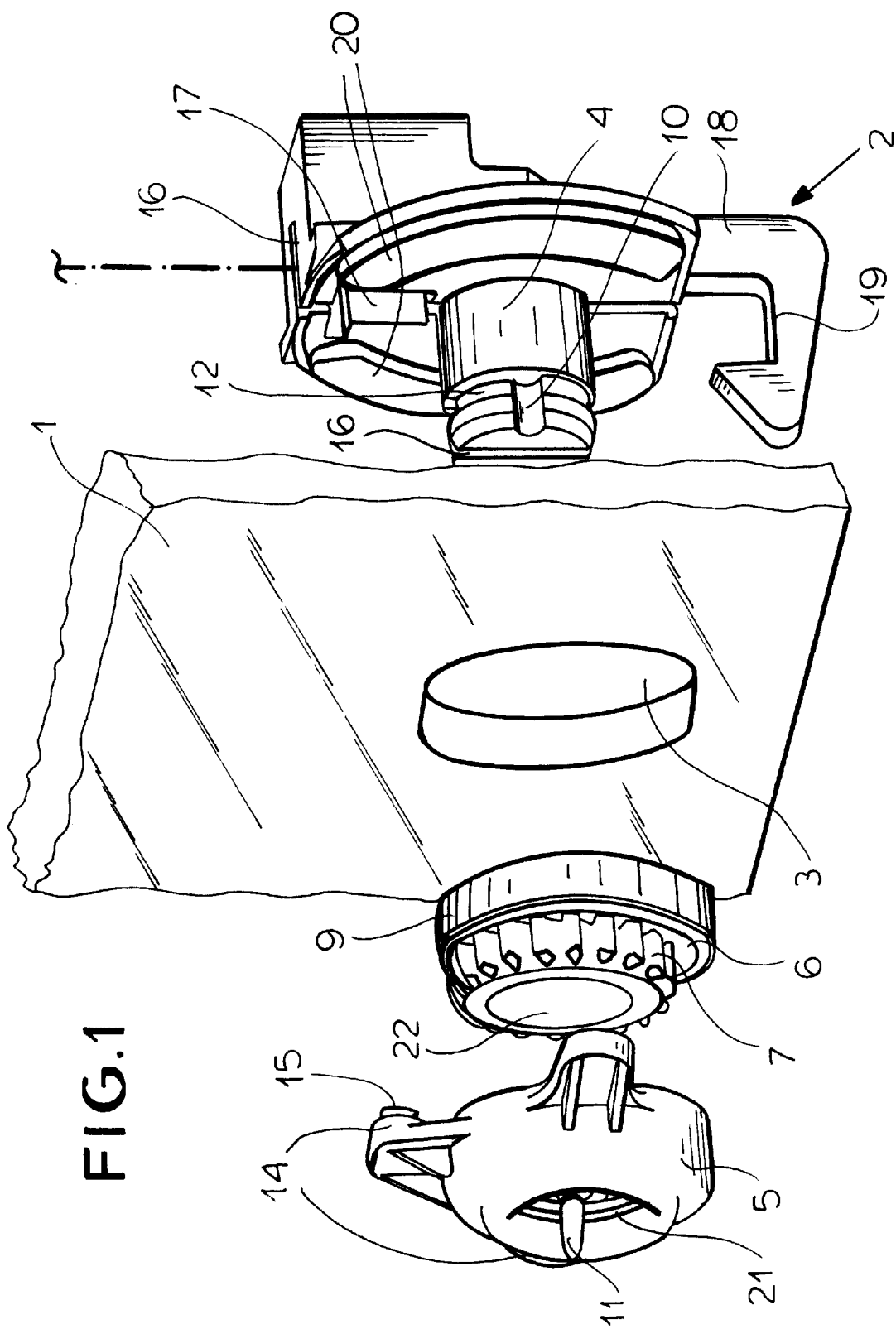
FIGS. 1 and 2 are front and back exploded views of the glass mount according to the invention.
Figure 2:
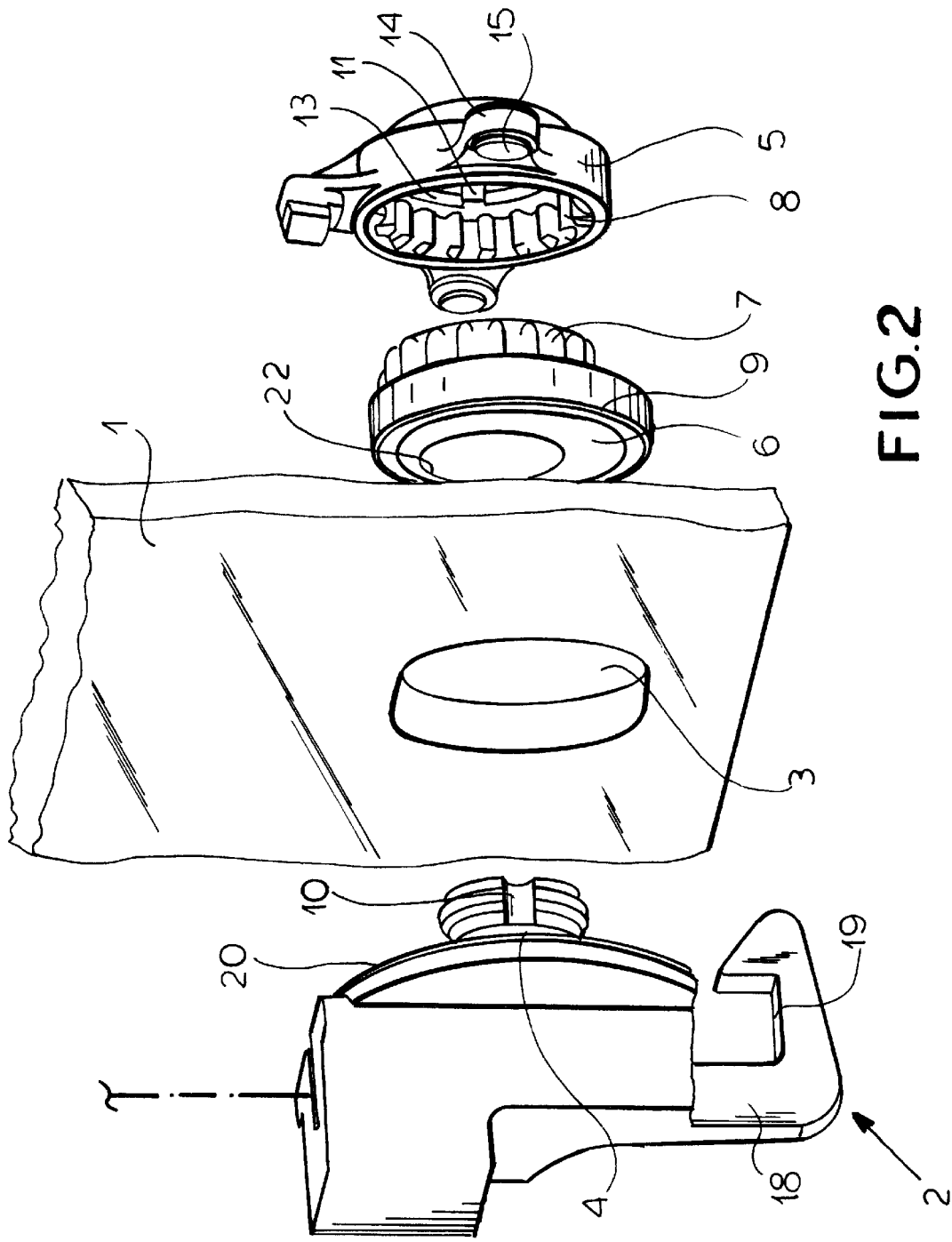
Figure 3:
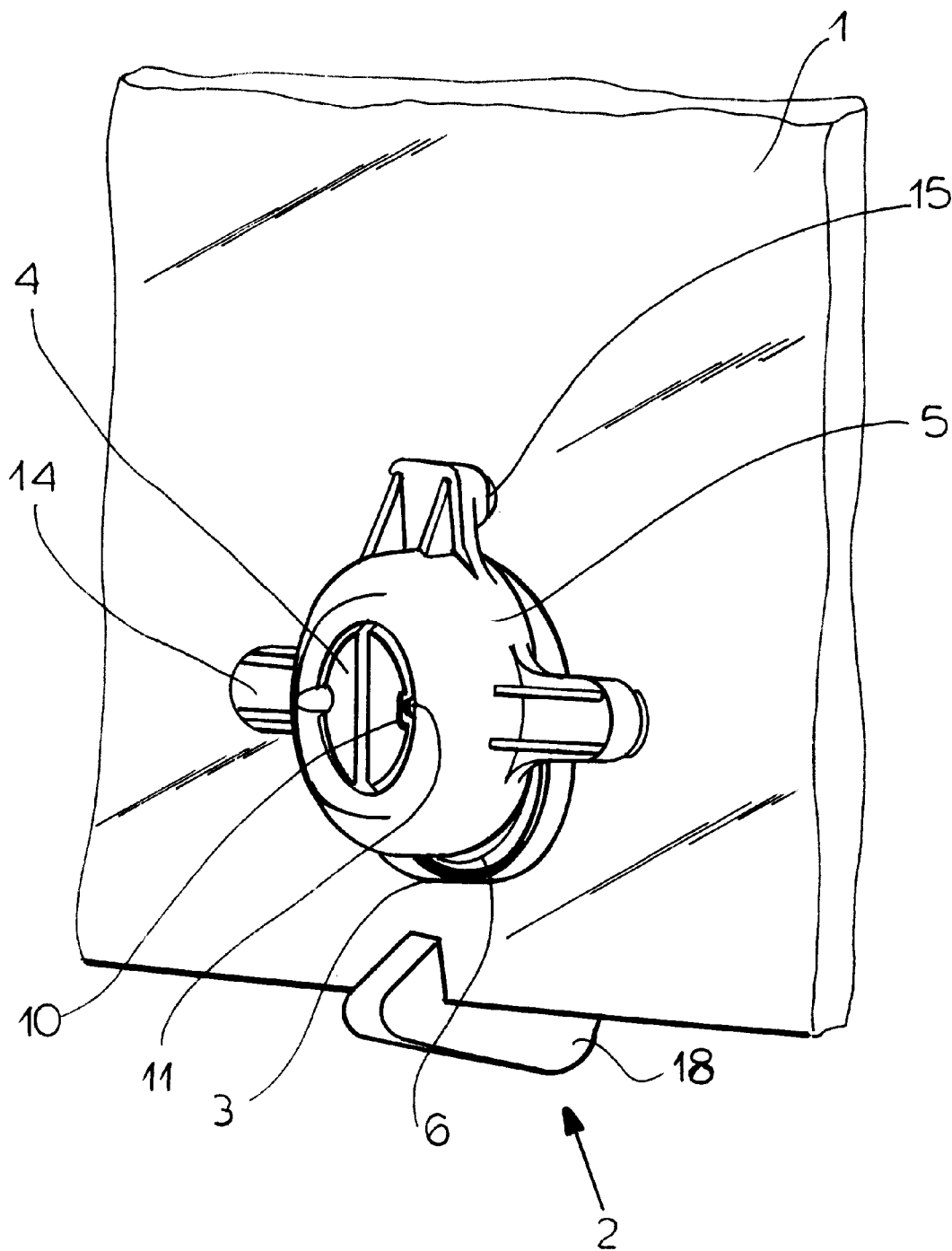
FIGS. 3 and 4 are front and back views of the installed mount in accordance with the invention.
Figure 6:
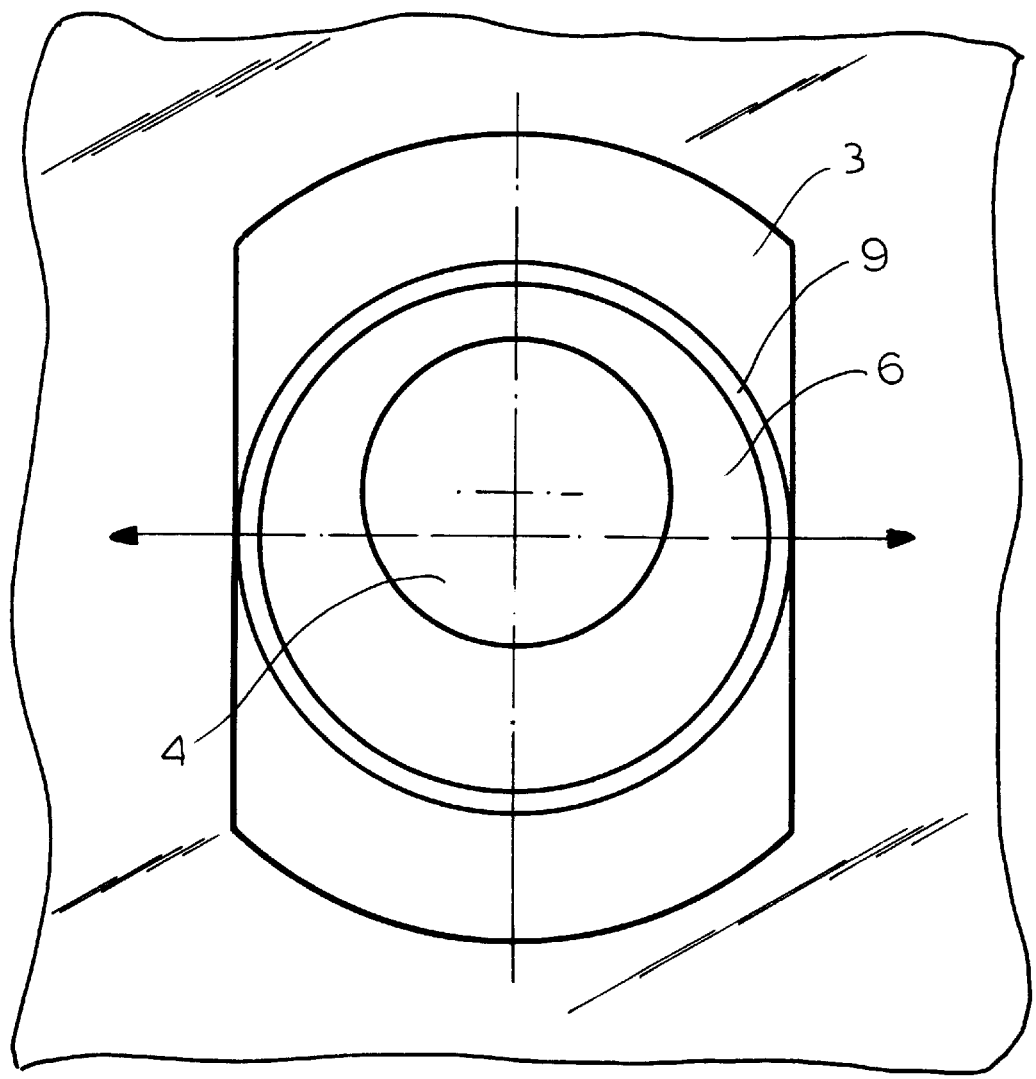
FIG. 6 is an end view in enlarged scale showing the glass mount with one part removed for clarity of view.

As seen in FIGS. 1 and 2 a glass window 1 is secured between a mount body 2 and a retaining body 5 that engage opposite sides of the window 1 at a vertically elongated hole 3 formed through the window 1. As shown in FIG. 6 the hole 3 has a pair of flat sides and circularly rounded upper and lower ends. The mount body 2 has a cylindrical pin 4 that passes centrally through the hole 3 and that fits into a central complementarily cylindrical passage or seat 21 of the body 5. An outer ring 9 of a hard plastic that will not chip the glass of the window 1 has a cylindrical outer periphery that fits in the opening 3 between its straight sides and a coaxial inner cylindrical periphery centered on an axis 9A. An eccentric inner ring 6 has a cylindrical outer periphery that fits complementarily in the outer ring 9 and a central passage 22 that is cylindrical but eccentric to the outer periphery. The rings 6 and 9 are fixed together and the ring 9 is made of a material that will not mar or damage the glass of the window 1. This inner ring 6 is formed on one side with a spline-like array of outwardly directed and angularly equispaced teeth 7 centered on an axis 7A which is the axis of the passage 22. Thus the inner ring 6 can be rotated in the outer ring 9 with movement of the axis 7A about the axis 9A. The passage 22 is shaped like the passage 21 to fit complementarily and snugly around the pin 4.

The outer retaining body 5 is formed internally with spline-like teeth 8 that can mesh complementarily with the teeth 7 and with a pair of inwardly directed ridges 11 that can fit in complementary diametrically opposite grooves 10 in the outer end of the pin 4. Thus this retainer 5 can only fit in one position over the pin 4, but on the other hand the inner ring 6 can fit in any of a multiplicity of angularly offset positions in the retainer 5, in each of which the pin 4 assumes a different position relative to the hole 3. Furthermore the retainer 5 is formed in its passage 21 with an inwardly directed ridge 12 that can snap in an outwardly open groove 13 of the pin 4 to retain the two bodies 2 and 5 together.

The retainer 5 has three 900 offset arms 14 each with a plastic bumper pad 15 that engages the respective face of the window 1 to prevent it from rocking. The body 2 of the mount similarly has a plastic gasket 20 that engages its face of the window 1 to prevent it from marring or chipping the glass.

The body 5 has a slot 16 that can hold an anchor pin 17 at the end of a cable 23 for raising and lowering the window. This anchor 17 can be slid into the wide lower end of the slot 16 before the mount body 2 is fitted to the window to capture it in place. In addition the lower part of the body 5 is formed with a hook-like arm 18 having a cushioned upper surface 19 that can engage under a lower edge of the window 1 to help it carry the weight of this window 1.

Figure 4:
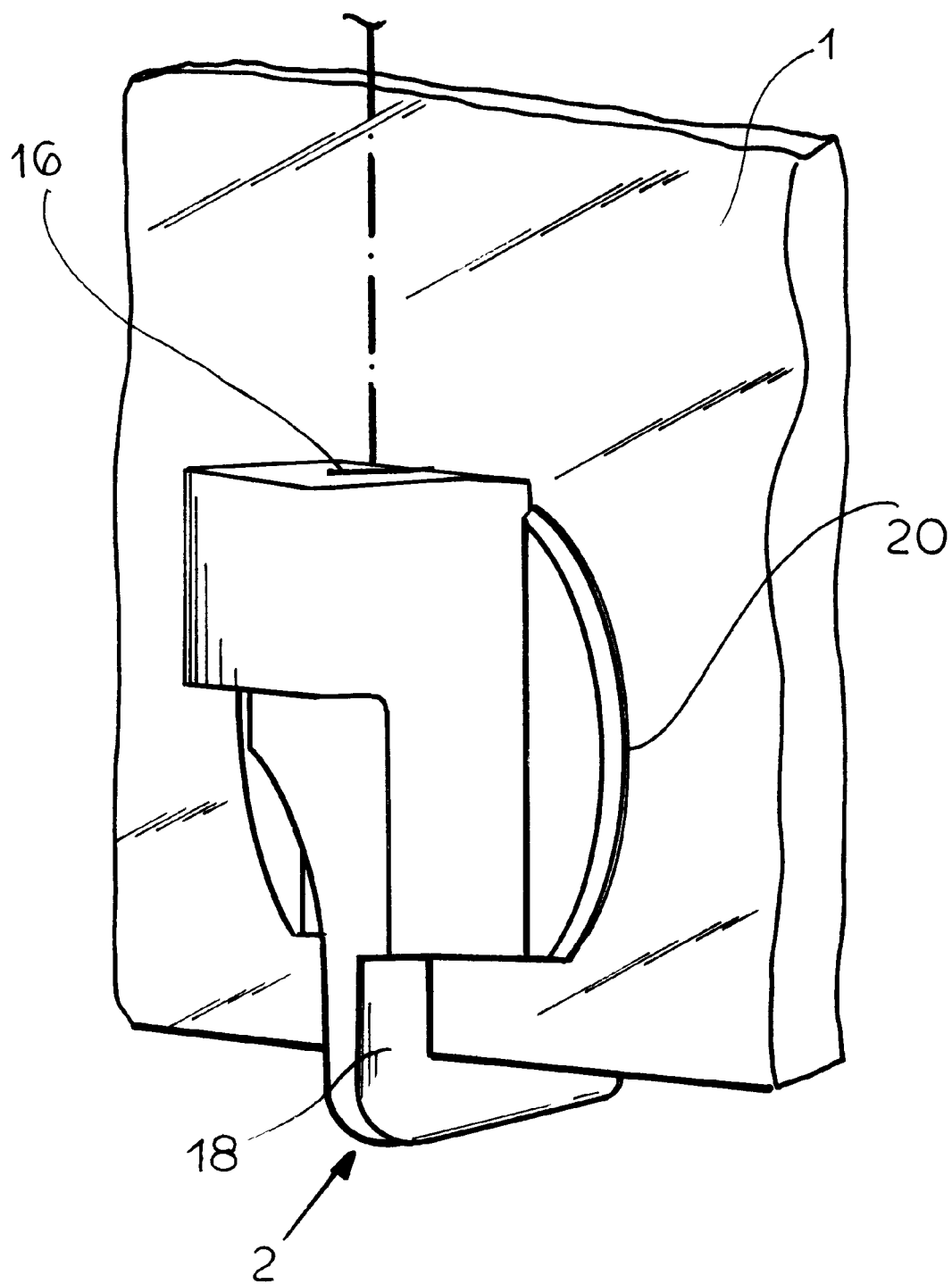
Figure 5:
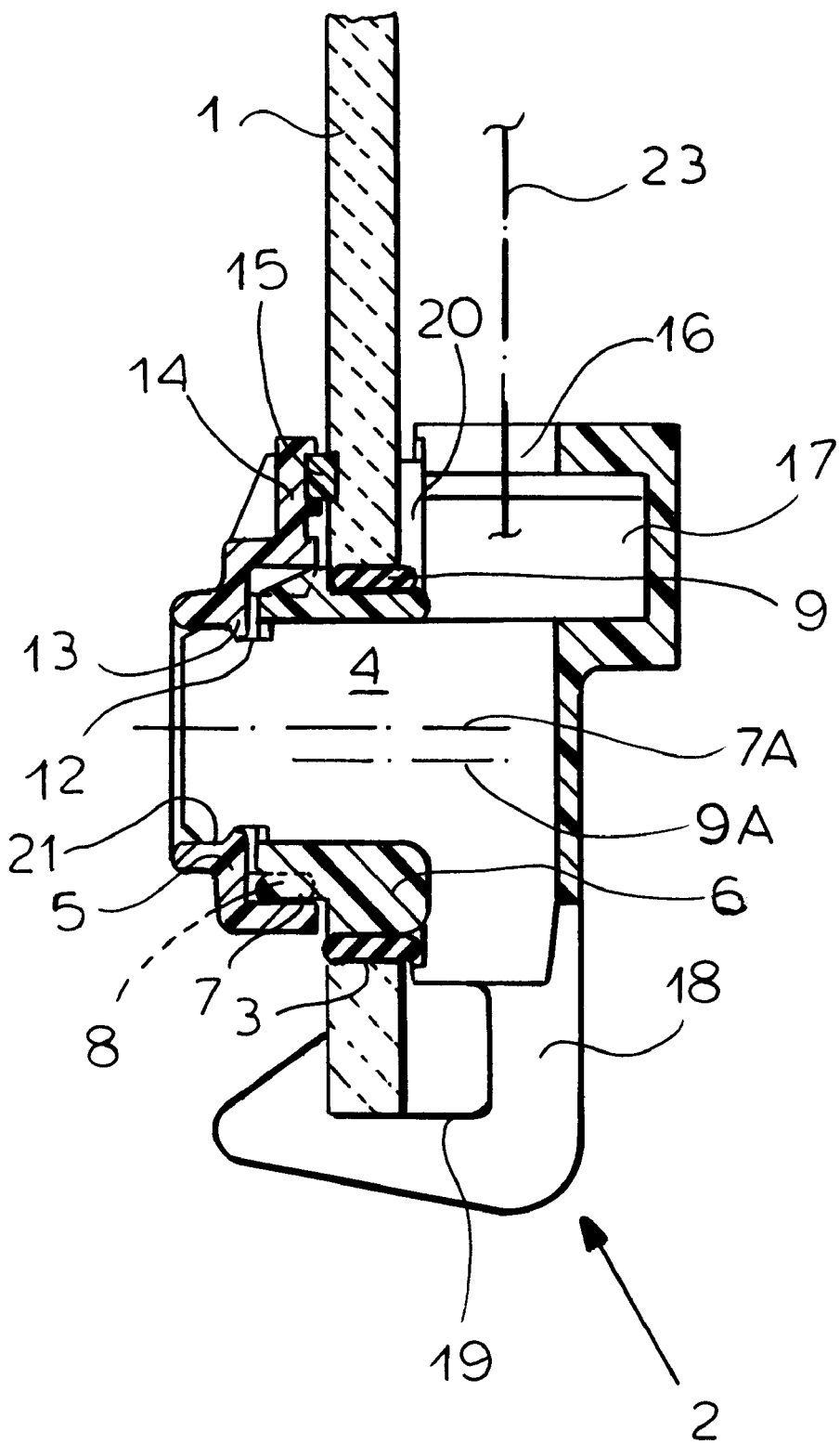
FIG. 5 is an axial section through the glass mount.
Figure 7:
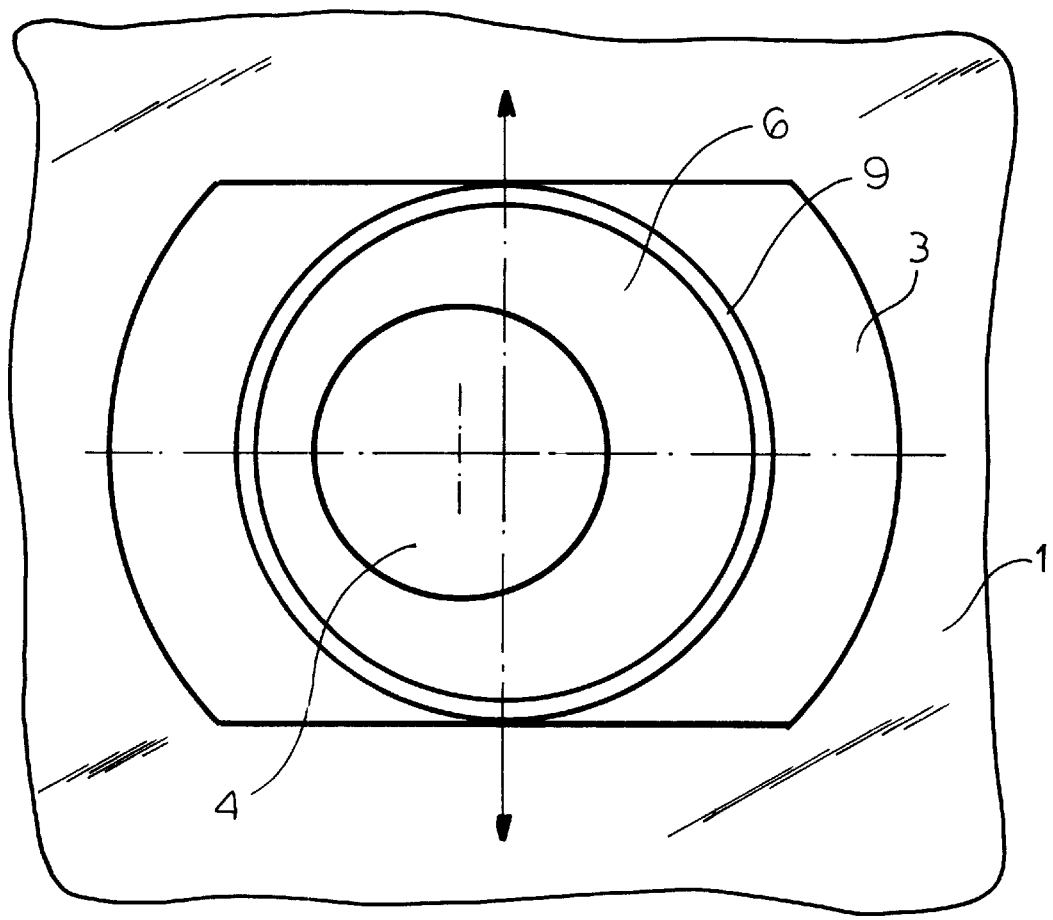
FIG. 7 is an end view like FIG. 6 showing an alternate arrangement according to the invention.

It is therefore possible to rotate the body 6 to move the pin 4 horizontally as illustrated by the arrows in FIG. 4. When two such mounts are provided on a window, this adjustment therefore varies the spacing between them. In an alternative arrangement where the slot 3 is horizontally elongated as shown in FIG. 7, such movement allows vertical adjustment as indicated by the arrows.

I claim:

1. In combination with a window having a pair of faces and a hole extending between the faces, a mount comprising:
    a body engaging one of the faces and having a pin projecting with play through the hole and past the other face and defining a pin axis;
    a retainer engaging the other face and formed with a passage snugly receiving the pin, the pin and retainer having axially extending interengaging formations that angularly lock the retainer on the pin;
    an eccentric ring engaged in the hole, having an eccentric passage snugly receiving the pin, rotatable on the pin about the pin axis, and having an outer periphery directly engaging the window in the hole between the faces and centered on a ring axis offset from the pin axis; and
    formations on the ring and on the retainer interengageable in any of a multiplicity of angularly offset position of the retainer relative to the eccentric ring and retaining the ring against rotation in the hole relative to the bodies, the pin being in a different position relative to the window hole in each of the angularly offset positions.

2. In combination with a window having a pair of faces and a hole extending between the faces, a mount comprising:
    a body engaging one of the faces and having a pin projecting with play through the hole and past the other face;
    a retainer engaging the other face and formed with a passage snugly receiving the pin;
    an eccentric ring engaged in the hole and having an eccentric passage snugly receiving the pin and having an outer periphery directly engaging the window in the hole between the faces; and
    formations on the ring and on the retainer including an array of outwardly directed teeth on the ring and an array of inwardly directed teeth on the retainer interengageable in any of a multiplicity of angularly offset position of the retainer relative to the eccentric ring and retaining the ring against rotation in the hole relative to the bodies, the pin being in a different position relative to the window hole in each of the angularly offset positions.

3. In combination with a window having a pair of faces and a hole extending between the faces, a mount comprising:
    a body engaging one of the faces and having a pin projecting with play through the hole and past the other face;
    a retainer engaging the other face and formed with a passage snugly receiving the pin;
    an eccentric ring engaged in the hole and having an eccentric passage snugly receiving the pin and having an outer periphery directly engaging the window in the hole between the faces, the eccentric ring including
        an inner ring having a cylindrical inner periphery forming the eccentric-ring passage and a cylindrical outer periphery having a center offset from that to the inner periphery, and
        an outer ring having a cylindrical inner periphery engaging the inner-ring outer periphery and an outer periphery complementary to the window hole; and
    formations on the ring and on the retainer interengageable in any of a multiplicity of angularly offset position of the retainer relative to the eccentric ring and retaining the ring against rotation in the hole relative to the bodies, the pin being in a different position relative to the window hole in each of the angularly offset positions.

4. The window mount defined in claim 3 wherein the outer ring is of a soft nonmetallic material.

5. In combination with a window having a pair of faces and a hole extending between the faces, a mount comprising:
    a body engaging one of the faces and having a pin formed with an outwardly open circumferential groove, projecting with play through the hole past the other face, and defining a pin axis;
    a retainer engaging the other face and formed with a passage snugly receiving the pin and with an inwardly projecting ridge engaged in the groove and retaining the pin in the retainer;
    an eccentric ring engaged in the hole, having an eccentric passage snugly receiving the pin, rotatable on the pin about the pin axis, and having an outer periphery directly engaging the window in the hole between the faces and centered on a ring axis offset from the pin axis; and
    formations on the ring and on the retainer interengageable in any of a multiplicity of angularly offset position of the retainer relative to the eccentric ring and retaining the ring against rotation in the hole relative to the bodies, the pin being in a different position relative to the window hole in each of the angularly offset positions.

6. In combination with a window having a pair of faces and a hole extending between the faces, a mount comprising:
    a body engaging one of the faces, having a pin projecting with play through the hole and past the other face and defining a pin axis, and provided with a plurality of arms extending radially of an axis of the pin and bearing axially on the one face of the window;

a retainer engaging the other face and formed with a passage snugly receiving the pin;

an eccentric ring engaged in the hole, having an eccentric passage snugly receiving the pin, rotatable on the pin about the pin axis, and having an outer periphery directly engaging the window in the hole between the faces and centered on a ring axis offset from the pin axis; and formations on the ring and on the retainer interengageable in any of a multiplicity of angularly offset position of the retainer relative to the eccentric ring and retaining the ring against rotation in the hole relative to the bodies, the pin being in a different position relative to the window hole in each of the angularly offset positions.

7. The window mount defined in claim 6 wherein the arms have padded ends engaging the one face.

8. The window mount defined in claim 1 wherein the body and pin are formed with an anchor slot for a lift cable.

9. The window mount defined in claim 8 wherein the body is formed on the slot with a seat for an anchor on the lift cable.

10. The window mount defined in claim 8 wherein the body has padded bumpers to each side of the slot engaging the one face.

11. The window mount defined in claim 1 wherein the body is formed with an arm engaging around an edge of the window to the other face thereof.

12. The window mount defined in claim 11 wherein the body and pin are formed with an anchor slot for a lift cable and the arm is offset from the slot.

13. The window mount defined in claim 10 wherein the arm is a hook.

14. The window mount defined in claim 1 wherein the eccentric ring has a noncylindrical outer periphery complementary to an inner periphery of the window hole.

15. The window mount defined in claim 1 wherein the body, eccentric ring, and retainer are made of hard plastic.

* * * * *